United States Patent [19]

Yang

[11] 4,301,977
[45] Nov. 24, 1981

[54] DUAL TENSION STRAP RETRACTOR

[75] Inventor: Elmer C. Yang, Orange, Calif.

[73] Assignee: Pacific Scientific Company, Anaheim, Calif.

[21] Appl. No.: 99,629

[22] Filed: Dec. 3, 1979

[51] Int. Cl.³ .................... A62B 35/00; B65H 75/48
[52] U.S. Cl. ............................ 242/107; 242/107.4 R
[58] Field of Search ......................... 242/107–107.7; 280/802–808; 297/475–478

[56] References Cited

U.S. PATENT DOCUMENTS

| | | | |
|---|---|---|---|
| 4,088,281 | 5/1978 | Close | 242/107 |
| 4,099,683 | 7/1978 | Stouffer et al. | 242/107 |
| 4,113,062 | 9/1978 | Beland | 242/107 X |
| 4,215,830 | 8/1980 | Cunningham | 242/107 |
| 4,216,922 | 8/1980 | Weman | 242/107 |

Primary Examiner—John M. Jillions
Attorney, Agent, or Firm—Knobbe, Martens, Olson, Hubbard & Bear

[57] ABSTRACT

A shoulder strap retractor mechanism employs a gear system and clutch that connects a rewinding spring to the strap to shift from a direct high tension mode to an indirect drive reduced tension mode for a limited range of strap movement to improve the user's comfort, while maintaining the strap lightly against the user's shoulder.

17 Claims, 12 Drawing Figures

DUAL TENSION STRAP RETRACTOR

FIELD OF THE INVENTION

This invention relates to a strap retraction mechanism that is particularly useful on personnel restraint systems such as seat belts and shoulder straps for automobile, aircraft or other vehicular use. The invention is particularly useful in connection with means employed for rewinding a shoulder strap.

BACKGROUND OF THE INVENTION

Typically, a shoulder strap in a restraint system must be relatively long in order to extend from a person's waist to some attachment point above or behind the person. In addition there must be sufficient strap to accommodate the largest person to use the system, plus provide for some freedom of movement. Because of the length of the strap, it is normally necessary to provide a relatively strong rewinding spring which will produce sufficient torque to urge the strap into a fully retracted position.

The user is permitted to move against the retracting force, and the strap will usually be locked in response to the sensing of a danger, such as sudden extension of the strap, deceleration of the vehicle or other triggering means. It is desirable that the strap be continuously under a retracting force so that the user will be immediately restrained when the strap is blocked from further strap extension. If the strap is constantly under a relatively strong retracting force, the strap can be annoying or cause irritation to the wearer's shoulder over a prolonged period of time.

A variety of solutions have been developed but all have various disadvantages. To overcome this problem, some retractors currently on the market provide a dead zone without any retracting tension for a given amount of movement of the wearer's upper torso. A shortcoming of this approach is that the wearer's upper torso can move a considerable distance before the locking mechanism on the retractor is actuated, so that the strap is subjected to a sudden large impact due to the momentum of the extra traveling distance. This is undesirable with respect to the strap, and the wearer may be injured by the impact.

There are also systems requiring a manual adjustment to eliminate the tension, such as pushing a button or moving a clip on the strap to receive the strap tension. This of course is inconvenient and can create an unsafe situation in that many people do not realize the importance of limiting the amount of freedom with no load. Another disadvantage is that these manual approaches require readjustment for users of different sizes. Also, some wearers feel more secure with tension, and think their restraining system is not functioning if there is no tension on the strap.

Another system provides a relatively complicated electric drive to insure proper strap rewinding. A need still exists for a system which will provide greater comfort to the wearer in a simple and automatic manner while still meeting the necessary safety requirements, which are basic to the entire subject.

SUMMARY OF THE INVENTION

In accordance with the invention, a system is provided wherein the retracting tension on a shoulder strap is reduced but not eliminated over a predetermined but limited range of movement. The mechanism for initiating the reduction in tension is actuated automatically by a slight retracting movement on the strap after the strap has been extended. Thus, when a user attaches the strap in restraining position over his shoulder, the spring tension on the strap is at the high level, but allowing the strap to retract slightly will reduce the tension on the strap. The reduced tension will be maintained over a limited range of movement, preferably only three or four inches of strap movement. This will permit comfortable movement for the wearer during much of the normal shoulder movement while operating a vehicle.

If, however, the wearer should move his upper torso so as to extend the strap beyond the range in which reduced tension is provided, the retractor mechanism will automatically shift to full or high tension. Similarly, if the strap is retracted beyond this range, the retractor mechanism will automatically shift to the high tension mode. This insures that when the strap is fully retracted and then once more extended to be strapped into position by a user, the strap is under tension as the strap is being extended. Since the reduced tension feature is initiated by retraction of the shoulder strap, the zone of reduced tension can be actuated at any point on the strap extension.

In a preferred form of the invention, the retracting mechanism which provides the dual tension on the strap employs a planetary gear arrangement and a unique clutch which provides full strap tension when the strap reel is driven in a direct one to one ratio by the rewinding spring. In the zone of reduced tension, the rewinding spring load on the strap reel is transmitted through the planetary gearing on an indirect manner in a less than one to one ratio, such as one to three so that the strap load is only one third of full load. The particular ratio employed may of course be selected as desired.

In the structure illustrated in the drawings, a sun gear is fixed to the shaft of the strap reel. A ring gear surrounding the sun gear is permitted to rotate in either direction in one mode of operation but limited to one direction in another mode by means of a capstan spring type clutch. A pair of planet gears positioned within the annular space between the sun gear and the ring gear are rotatably mounted on stub pins carried by a disc having a shaft connected to a rewinding spring. The stub pins on which the planet gears are mounted extend through arcuate slots in a disc shaped plate attached to the ring gear. A rocket block element carried by the ends of the capstan spring engages a surrounding housing and is moveable to two different positions to control the spring clutch and hence the movement of the ring gear.

Although the construction of the retracting mechanism is quite unique and somewhat intricate, the number of components is small and they are readily fabricated. Further, the operation is practical and reliable.

DETAILED DESCRIPTION OF A PREFERRED EMBODIMENT OF THE INVENTION

Figures 1, 2, 3:
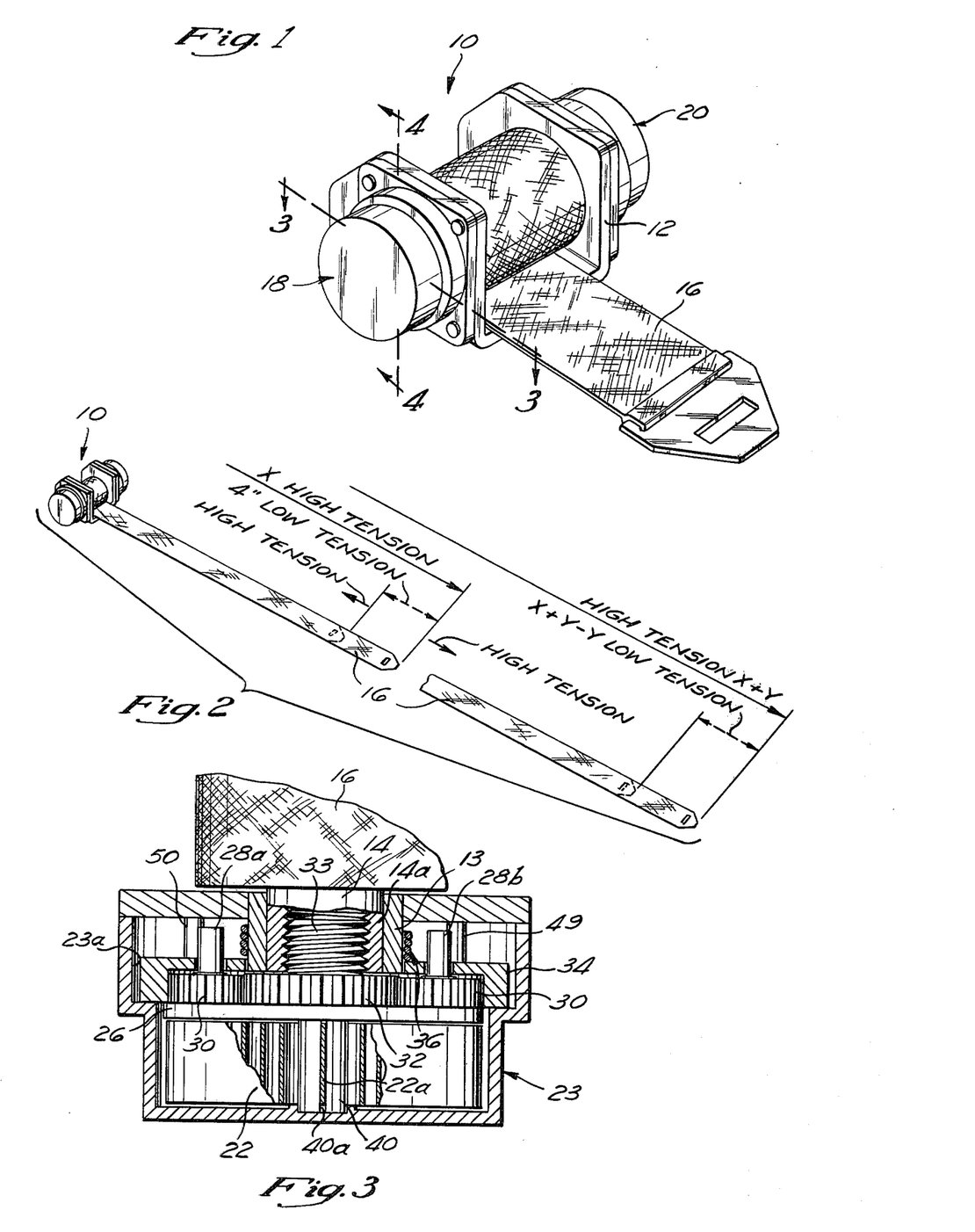
FIG. 1 is a perspective view of a shoulder strap, retractor and locking assembly incorporating the invention.
FIG. 2 shows the retractor with the strap extended and schematically illustrates the adjustable and moveable nature of the zone of reduced tension.
FIG. 3 is a cross-sectional view on horizontal line 3—3 of FIG. 1.

The strap, retractor and locking assembly 10 of FIG. 1 includes a generally U-shaped frame or bracket 12 having mounted thereon a strap reel 14, shown in FIG. 3, and a strap 16 fixed to the spool. Mounted on one side of the bracket 12 and connected to one end of the strap reel is a retractor spring mechanism 18. Mounted on the other side of the bracket 12 and connected to the other end of the strap reel is a strap locking mechanism 20.

One type of strap locking mechanism that is commonly used is an inertia device that is sensitive to acceleration of the strap 16, which occurs when the user is thrown forward during a crash. Those skilled in the art are familiar with a wide variety of devices of this type, and hence no detailed description of such a mechanism is required. It should be understood, however, that there are a variety of other locking mechanisms that can be employed with the strap retracting mechanism 18 of the invention, including, for example, locking devices that are sensitive to vehicle deceleration.

Figures 4, 5:
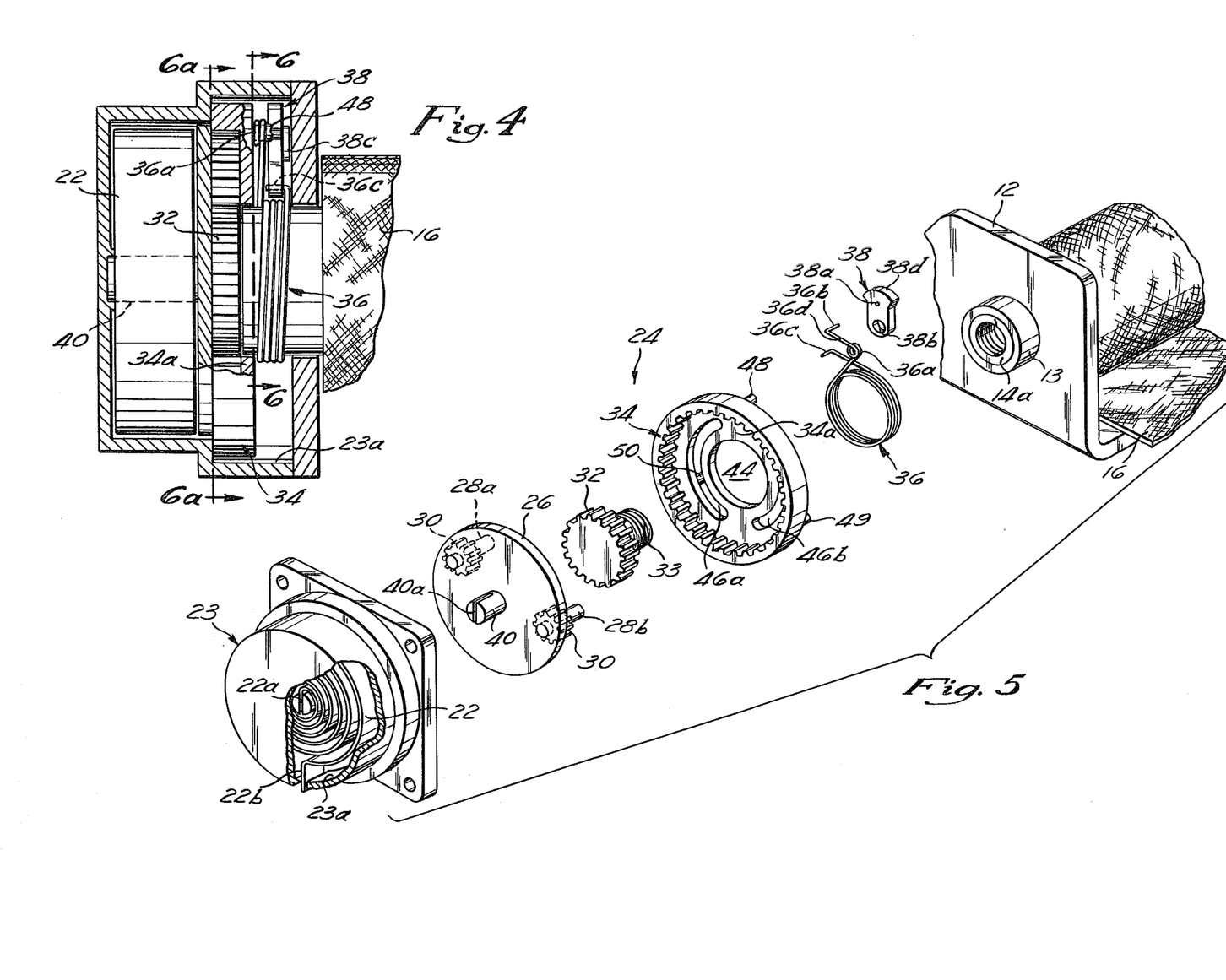
FIG. 4 is a cross-sectional view of a retractor mechanism on vertical line 4—4 in FIG. 1.
FIG. 5 is an exploded perspective view of components of the retractor mechanism.

Referring to FIG. 5, as well as FIGS. 3 and 4, it may be seen that one leg of the bracket 12 includes an outwardly extending collar 13, and the reel 14 includes an outwardly extending shaft portion 14a which is rotatably supported within the collar 13. The shaft 14a has a threaded socket which opens to its outer end.

The strap shaft 14a is connected to a strap retracting spring 22 by means of a gear train and a clutch mechanism 24. The spring 22 and mechanism 24 are conveniently mounted in a cup-shaped housing 23 which is attached to the bracket 12. The gear and clutch mechanism 24 includes a disc 26 carrying a pair of accurately spaced, axially extending pins 28 which rotatably support a pair of planet gears 30, and further includes a sun gear 32, a ring gear 34, a clutch spring 36 and a rocker lever or block 38. The disc 26 includes a stub shaft 40 which extends into the center of the coil spring 22 and receives an end tab 22a of the spring in a slot 40a formed in the shaft 40. The other end of the spring includes a tab 22b which is anchored in a slot in a portion of a spring housing 23. The sun gear 32 engages the planet gears 30 and includes a stub shaft 33 which threads into the threaded socket in the strap shaft 14a.

The planetary gears 30 mesh with the teeth of the ring gear 34 and the teeth of the sun gear 32. The ring gear 34 includes a disc-shaped plate 34a having a central hole 44 through which the sun gear shaft 33 extends. Also, the hole permits the ring gear to fit onto the outer end of the collar 13 for rotational support. The plate 34a is formed with a pair of arcuate slots 46 that extend approximately 130° each, on opposite sides of the central axis of the ring gear. One of the planet gear shafts 28a extends through one of the slots 46a and the other shaft 28b extends through the other slot 46b.

Three pins 48, 49, and 50 extend axially from the ring gear plate 34a on the opposite side from the ring gear teeth to engage or extend closely to the side of the reel bracket 12, and thus space and balance the ring gear. The pin 48 serves an additional very important function in controlling operation of the clutch spring 36.

As can be seen from FIG. 5, the clutch spring 36 includes a plurality of central coils which are wrapped around the fixed collar 13. The coils are sized to slightly grip the collar 13 in the manner of a capstan spring. One end of the spring 36 includes an additional coiled portion 36a which is positioned on the ring gear pin 48. That same spring end includes an outer leg 36d with an outer axially extending tang 36b which fits within an aperture 38a in the rocker block 38. The other end of the spring 36 includes an axially extending tang 36c that extends on the other side of the rocker block into an enlarged hole 38b formed within the block 38. Thus, the rocker block 38 is carried by the ends of the spring 36, but is mounted for limited pivotal movement about the spring tang 36b. Such movement is accommodated by the fact that the diameter of the tang 36c is smaller than the diameter of the hole 38b in the lower end of the rocker block 38. As seen from FIG. 4 and from FIG. 6, the rocker block 38 includes a circular boss 38c which extends towards the bracket 12 to position the rocker block. The outer surface 38d of the rocker block is curved to form a cam surface engaging the inner cylindrical surface 23a of a portion of the cup shaped housing 23.

OPERATION

In operation, the retracting mechanism of the invention provides dual tensioning or load on the strap 16. In one mode of operation the tension produced on the strap 16 by the retractor spring 22 may be thought of as the full or high tension that usually exists as the strap is extended and retracted. In this mode the retractor mechanism provides retracting force equal to that which would be provided if the retracting spring were directly connected to the strap reel shaft 14a. In another mode of operation the tension on the strap is reduced to provide a greater degree of freedom or comfort to the user's shoulder while still maintaining the strap against the user's shoulder. This insures that the person's upper torso is engaging the strap to some extent at all times so that when the strap is locked during an emergency, there is no free movement wherein the person's torso moves forwardly to engage the locked strap.

The dual tension operation is obtained by changing the drive connection through the planetary gear train. This may be considered as roughly analgous to shifting gears in an auto gear train. The first gear might be thought of as the direct drive wherein one rotation of the retractor spring shaft 40 produces one rotation of the strap shaft 14a. This is comparable to low gear in a vehicle which can accommodate high load and thus high strap load or tension in case of the present invention. The second mode of operation provides an indirect connection between the spring shaft and the strap shaft such that one revolution of the spring shaft produces greater rotation of the strap shaft. A ratio of about one to three has been used in the present invention. Such a speed ratio provides an inverse load ratio which results in reduced or low strap tension. Again utilizing the auto analogy, reduced torque is provided in high gear, although increased speed is obtained. In the present situation, the speed is of course primarily controlled by the motion of the strap such that it is the load ratio providing a reduced tension which is the significant factor. The zone of reduced or low tension is determined by the zone in which the indirect gear drive is utilized.

Figure 6:
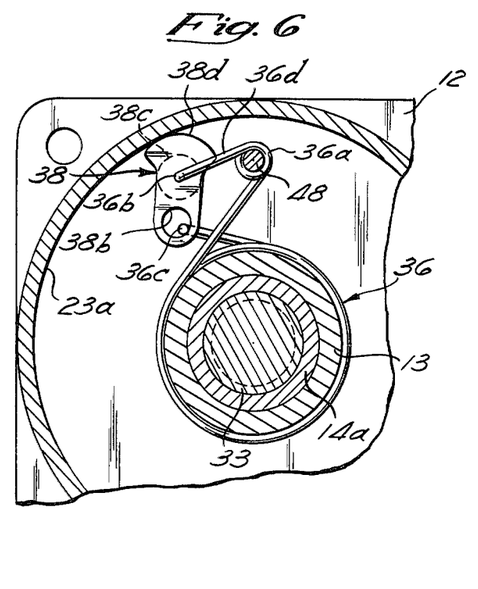
FIG. 6 is a cross-sectional view of a portion of the retractor mechanism on lines 6—6 of FIG. 4.

Consider now the detailed operation of the mechanism starting from a point of full belt retraction as shown in FIG. 1. Normally the components of the mechanism 24 will be in the positions shown in FIGS. 6 and 6a. In that situation, the capstan spring clutch 36 loosely grips the collar 13. The spring leg 36d provides a radially outward force on the rocker block 38 causing the cam surface 38d to be urged slightly against the fixed surface 23a. Providing a clockwise force on the ring gear 34, and more particularly the pin 48 tends to produce a winding force on the clutch spring 36 which increases the gripping of the spring on the fixed collar. Consequently with the rocker block positioned as illustrated in FIG. 6, clockwise movement of the ring gear and its pin 48 is prevented.

Figure 6A:
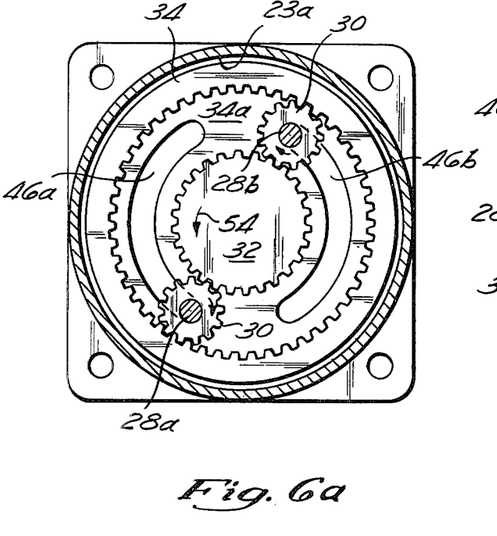
FIG. 6a is a cross-sectional view of the mechanism on line 6a–6a in FIG. 4.

Referring to FIG. 6a, extending the strap 16 produces a counterclockwise force on the sun gear 32, as indicated by the arrow 54. The retracting spring 22 through the spring shaft 40 and disc 26 provides a continual clockwise retracting force on the planetary gear pins 28. In other words, the rewinding spring urges the planetary gear pins to move in a clockwise direction in the arcuate slots 46. The counterclockwise force on the sun gear 32 rotates the planet gears 30 in a clockwise direction about the pins 28, which in turn produces a clockwise force against the teeth of the ring gear 34. Since the ring gear is prevented from rotating in the clockwise direction the engagement of the planetary gears with the ring gear teeth causes the planetary gear pins 28 to move in a counterclockwise direction against the urging of the rewinding spring. Since the pins 28 are already engaging the ends of the slots 46 as viewed in FIG. 6a, the force on the pins 28 is transmitted to the ring gear through its plate 34a to rotate in a counterclockwise direction. Consequently the sun gear, the planetary gears and the ring gear all move in a counterclockwise direction as the strap is being extended. This is a direct drive relationship between the strap shaft 14a and the spring shaft 40 such that the tension on the strap produced by the spring is at the full or high level. Note that during this movement in the counterclockwise direction the pin 48 urges the clutch spring in an unwinding direction and the rocker block cam surface 38d of FIG. 6 simply slides in engagement with the housing wall 23a. This tends to rotate the block 38 clockwise around tang 36(b) but such movement is stopped by 36c, thus keeping the relation as shown in FIG. 6.

If at any point in the strap extension, the extending movement is interrupted and some retraction occurs, the retracting force on the strap will be at reduced tension in that the gear mechanism will have shifted to an indirect connection between the spring shaft and the strap shaft. In the retracting movement, the continually applied clockwise force on the planetary gear pins 28 urges the pins to move in a clockwise direction in the arcuate slots 46, as illustrated in FIG. 7a. The movement of the pins in a clockwise direction produces a force on the ring gear 34 in a clockwise direction; but this also urges its pin 48 clockwise which causes the clutch spring to grip more tightly to prevent significant movement of the ring gear in a clockwise direction. Consequently a counterclockwise force is provided on the planetary gears 30. This in turn produces clockwise movement of the sun gear 32 causing retraction of the strap 16.

Figure 7:
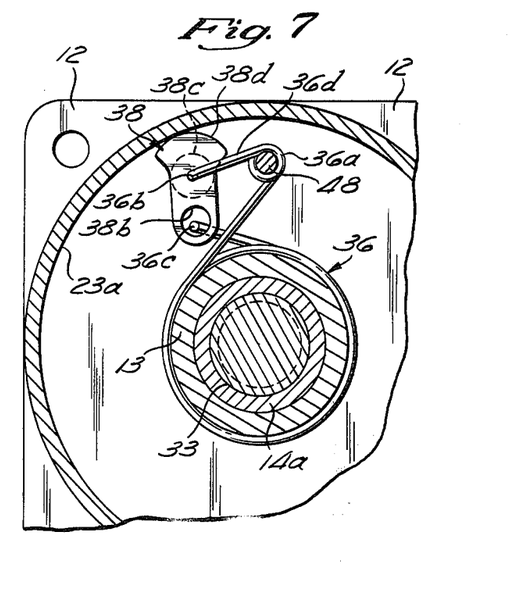
FIG. 7 is a cross-sectional view on line 6—6 of FIG. 4 but taken at a different operational position of the mechanism.
Figure 7A:
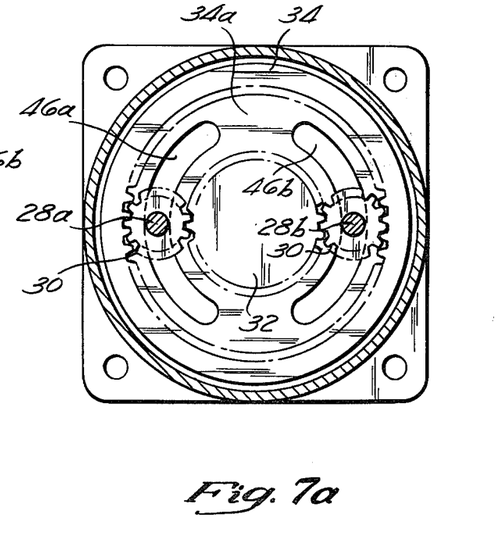
FIG. 7a is taken on line 6a—6a of FIG. 4 at the same operational position as FIG. 7.

Note from FIG. 7 that when the pin 48 is moved slightly in a clockwise direction, the drag between surfaces 38d and 23a urges the rocker block 38 in a counterclockwise direction. If the hole 38b were small the tang 36c would be moved by the block 38 in the direction to unwind the clutch spring, but the oversized hole permits the block to move without moving the tang 36(c).

In this mode of operation, the speed and load ratios between the spring and strap shafts have shifted so that the tension on the strap is reduced. In a preferred arrangement, the tension is reduced to approximately one-third of full tension. Other ratios can of course be obtained by changing the relationships between the gears. However, it has been found that such a ratio provides a good balance to the user wherein the significant reduction and tension greatly increases the typical user's comfort, but at the same time there is sufficient tension to maintain the strap reasonably snug against the wearer's shoulder so that there is a minimum of unrestrained movement of the wearer's upper torso against the strap in a crash situation.

The range of this reduced tension movement is limited by the movement of the planetary gear pins 28 within the limits of the slots 46. That is, the pins can move between one end of the slot to the other end of the slot in either retracting or extending directions and the reduced tension mode is maintained. This is sufficient to accommodate the usual or normal movement of a person's upper torso after the strap has been connected.

If the strap is extended from the position indicated by the gears in FIG. 7a, the planetary gears will return to the condition shown in FIG. 6a; and when the gear pins 28 engage the ends of the slots, the gearing will once again shift into the direct drive, high strap tension arrangement.

Figure 8:
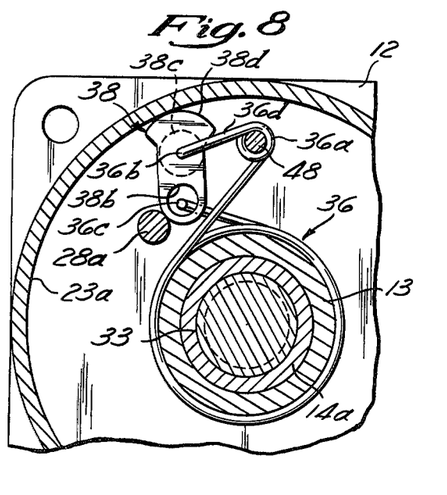
FIG. 8 is a cross-sectional view on line 6—6 showing yet another operational position just before the rocker block is to be snapped into an unblocking or released mode.

If on the other hand, the strap is retracted further from the condition shown in FIG. 7a, the planetary gear pins 28 will continue to move in a clockwise direction until they engage the clockwise ends of the slots 46. As the pin 28a shown on the left side of FIG. 7a nears the clockwise end of its slot 46, it engages the lower end of the rocker block 38 as shown in FIG. 8. Continued movement of the pin 28a in the clockwise direction snaps the rocker block 38 in a counterclockwise direction about the spring tang 36b, which moves the spring tang 36(c) and the spring loop 36a closer together, thus producing an unwinding force on the capstan spring clutch 36. This suddenly releases the ring gear 34 freeing it to move in a clockwise direction, as well as still being moveable in a counterclockwise direction.

Figure 9:
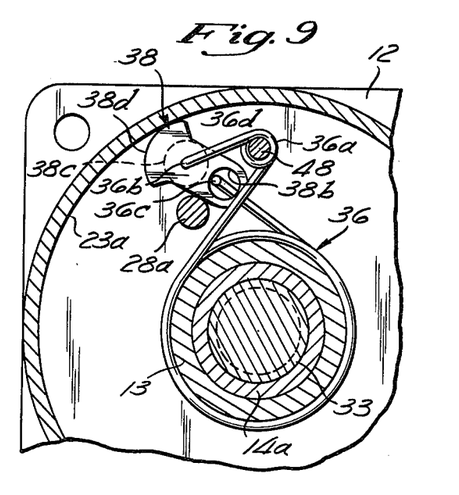
FIG. 9 is a cross-sectional view on line 6—6 of FIG. 4 showing yet another operational view wherein the rocker block has been snapped to its released mode.
Figure 9A:
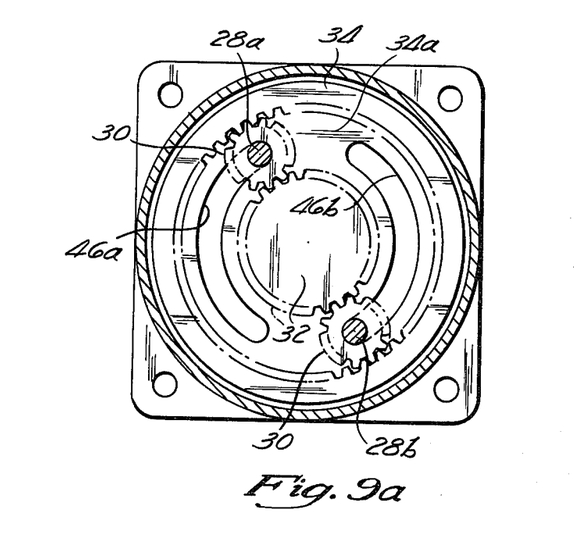
FIG. 9a is a view taken along line 6a—6a of FIG. 4 but at an instant corresponding to that of FIG. 9.

At the point that the rocker block is pivoted to the position shown in FIG. 9, the planetary gears appear as shown in FIG. 9a with respect to the slots 46 in the ring gear plate 34a. This condition is however, only momentary in that the gearing will shift to an interim mode. With the ring gear free to move in either direction, the planetary gears, receiving a load from the sun gear but essentially no load from the ring gear, will rotate in a clockwise direction causing the ring gear to move in a clockwise direction at a rate faster than the gear pins 28 move in that direction. Thus the opposite end of the slots 46 catch up with the pins so that the components reach the position shown in FIG. 6a. The planetary gear shafts 28 will then remain in this position relative to the ring gear, but continue moving in a clockwise direction in a direct one to one ratio with respect to the strap spool shaft 14a and the spring shaft 40. With the ring gear rotating in a clockwise direction the pin 48 moves in a clockwise direction urging the rocker block 38 to maintain the position shown in FIG. 9.

If the retraction movement is interrupted and the strap once more extended, the rocker block 38 will switch to the condition shown in FIG. 6. This occurs because the counterclockwise strap extending force, as explained in connection with FIG. 6a above, produces clockwise rotation of the planetary gears 30. This in turn urges the ring gear to move in a clockwise direction. This produces drag on the rocker block 38 in a direction to cause the block to once more pivot to the position shown in FIG. 6. This causes the clutch spring 36 to tighten and prevent rotation of the ring gear in the clockwise direction, once more returning the mechanism to the situation described above in connection with FIG. 6a. In this mode the mechanism is still in the direct drive high tension load as explained above.

As mentioned one of the features of the invention is that the low tension on the strap automatically starts at any location of strap travel merely by retracting the strap. Further, the fact that the low load is limited to a predetermined range at whatever location it is initiated is a significant advantage. This is schematically illustrated in FIG. 2. If the strap 16 is first extended any given distance x under high strap tension, retracting the strap at that point will automatically shift the retracting mechanism into low tension mode for a predetermined distance. It has been found that four inches is a convenient length in that it provides the user adequate freedom of movement in the low tension range. The strap may be repeatedly moved in retracting or extending directions within this four inch range, all the time remaining in the low tension mode. If the strap is retracted more than four inches into the less than x−4 range, the gear mechanism will automatically shift into the high tension mode. Similarly, if the strap is extended beyond the x distance from the low tension range an additional distance y, the tension will automatically shift to high. If the strap is once more allowed to retract at the x+y location, the gear mechanism will automatically shift to the low tension mode for a range of four inches from x+y to x+y−4.

Frequently when a strap is first buckled into position, it is extended a greater distance than necessary such that there is some initial retraction. This will automatically place the retractor in the low tension mode. Alternatively, if the strap is drawn directly into latched position, the strap will remain in the high tension mode. However, most users will almost immediately move their shoulders backwards and forwards a small amount while adjusting their seating position. This will place the mechanism in the low tension mode.

While the invention has been described in connection with a shoulder strap, the mechanism is of course useful in any retractor situation wherein a reduced tension load on the strap or belt is desired, while still maintaining a desired tension.

What is claimed is:

1. Restraint apparatus comprising a support, a reel rotatably mounted on the support, a flexible element wound on the reel, one spring for urging the reel into an element retracted position, and drive means interconnecting said spring and the reel including means for automatically shifting the retracting force provided by said spring on the element from a high tension mode to a reduced but still positive tension mode wherein said automatic shifting means includes:
   a planetary gear system including a sun gear attached to said reel, a planetary gear meshed with said sun gear, and a ring gear meshed with said planetary gear;
   means coupled to said spring and to said planetary gears for automatically shifting said planetary gear system from direct drive of said reel by said spring in said high tension mode and for shifting said planetary gear system into indirect drive of said reel by said spring through a different load ratio during reduced tension operation.

2. The apparatus of claim 1 wherein said shifting means includes means responsive to retraction of said element after a period of extension for shifting the drive means to provide said reduced tension mode.

3. The apparatus of claim 1 or 2 including means for maintaining said drive means in the reduced mode for a predetermined range of movement.

4. The apparatus of claim 1 wherein said shifting means includes means for shifting between said modes at any position of flexible element extension.

5. The apparatus of claim 1 wherein said shifting means includes means for automatically returning from said high mode to said reduced mode.

6. The apparatus of claim 1 wherein said drive means includes a clutch linked to said gear system to interconnect the rewinding spring and the reel in a direct drive arrangement for said high mode and into an indirect drive arrangement for said reduced mode.

7. The apparatus of claim 6 wherein said ring gear has an end plate with an axially extending pin affixed thereto, and wherein said clutch means includes:
   means cooperating with said axially extending pin and said support and responsive to the direction of movement of said flexible element for controlling the movement of said ring gear to cause said shifting between high tension and low tension modes in response to predetermined movements of said flexible element.

8. The apparatus of claim 7 wherein said cooperating means includes:
   a fixed drag surface on said support enclosing said ring gear;
   a fixed collar portion of said support;
   a capstan spring having a loop encircling said fixed collar and a loop encircling said axially extending pin, and having a pair of tangs;
   a rocker block corresponding with said tangs and said fixed drag surface such that the direction of said ring gear is controlled according to predetermined movements of said flexible element.

9. Restraint apparatus comprising a support, a reel rotatably mounted on the support, a flexible element wound on the reel, rewinding means for urging the reel into an element retracted position, and drive means interconnecting the rewinding means and the reel including means for automatically shifting the retracting force provided by said rewinding means on the element from a high tension mode to a reduced but still positive tension mode and wherein said drive means includes a gear system interconnecting the strap reel and the rewinding spring and including a clutch linked to said gear system to interconnect the rewinding spring and the reel in a direct drive arrangement for said high mode and into an indirect drive arrangement for said reduced mode; and wherein said gear system includes a sun gear fixed to the reel, a disk connected to said rewinding spring and supporting a pair of pins with planetary gears rotatably mounted thereon interengaged with said sun gear, and said system further includes a ring gear enclosing said planetary gears with said ring gear having an end plate with a pair of arcuate slots formed therein for receiving said planetary gear mounting pins, and said clutch includes a capstan spring cooperating with said ring gear plate and with a fixed drag surface for controlling the direction of rotation of said ring gear.

10. Restraing apparatus comprising a support, a reel rotatably mounted on the support, a flexible element wound on the reel, rewinding means for urging the reel into an element retracted position, and drive means interconnecting the rewinding means and the reel including means for automatically shifting the retracting force provided by said rewinding means on the element from a high tension mode to a reduced but still positive tension mode and wherein said drive means includes a gear system interconnecting the strap reel and the rewinding spring and including a clutch means linked to said gear system to interconnect the rewinding spring and the reel in a direct drive arrangement for said high mode and into an indirect drive arrangement for said reduced mode and wherein said gear system includes a sun gear fixed to the reel, a disk connected to said rewinding spring and supporting a pair of pins with planetary gears rotatably mounted thereon interengaged with said sun gear, and said gear system further includes a ring gear enclosing said planetary gears with said ring gear having an end plate with a pair of arcuate slots formed therein for receiving said planetary gear mounting pins, and said clutch means includes a capstan spring cooperating with said ring gear plate and with a fixed drag surface for controlling the direction of rotation of said ring gear and wherein one end of said capstan spring is formed with a spring loop which is positioned on a pin extending from said ring gear plate, and further including a pivotal rocker block element carried by tangs on the ends of said capstan spring, with the end of said spring extending from said loop urging said rocker block element into engagement with said fixed surface for assisting in holding said clutch means in either of said two modes, with said ring gear being moveable in either direction in one mode and being only moveable in the strap extending direction in the other mode.

11. In personnel restraint apparatus including a shoulder strap mounted on a reel and a spring connected to said reel to provide a continual strap retracting force on said strap, the improvement wherein the means connecting the spring to the reel comprises:
high mode drive means for providing a high retracting force;
low mode drive means providing a reduced retracting force; and
means for shifting between said modes and
wherein said high and low mode drive means include a planetary gear system in a housing with a fixed drag surface, said planetary gear system having a sun gear attached to said reel, a planetary gear coupled to said spring, and a ring gear having an end plate; and
wherein said shifting means includes a rocker block cooperating with said fixed drag surface and a clutch spring cooperating with said end plate and said rocker block for controlling the direction of rotation of said ring gear such that said planetary gear system is in either a direct drive high tension mode or an indirect drive low tension mode depending upon predetermined manipulations of said strap.

12. The apparatus of claim 11 wherein said shifting means includes means responsive to a change in direction of strap movement.

13. The apparatus of claims 11 or 12 including means for maintaining said low mode drive means in operation for a predetermined limited range of strap movement and then automatically shifting to said high mode drive means.

14. A shoulder strap retracting device comprising:
a support;
a reel rotatably mounted on the support;
a flexible element wound on said reel;
means urging said reel in the direction to wind said element on the reel; and
means responsive to retracting movement of said reel to reduce the retracting tension on said element from a high level to a reduced level and wherein:
said responsive means includes a planetary gear system in a housing with a fixed drag surface, said planetary gear system having a sun gear attached to said reel, a planetary gear coupled to said spring, and a ring gear having an end plate;
and wherein said shifting means includes a rocker block cooperating with said fixed drag surface and a clutch spring cooperating with said end plate and said rocker block and clutch spring for controlling the direction of rotation of said ring gear such that said planetary gear system is in either a direct drive high tension mode or an indirect drive low tension mode depending upon predetermined manipulations of said strap and wherein one end of said clutch spring is formed with a spring loop which is positioned on a pin extending from said ring gear end plate, and further including pivotal rocker block element carried by tangs on the ends of said clutch spring, with the end of said spring extending from said loop urging said rocker block element into engagement with said fixed drag surface for assisting in holding said clutch spring in either of said two modes with said ring gear being moveable in either direction in one mode and being only moveable in the strap extending direction in the other mode.

15. Apparatus for adjusting spring retracting tension on a reel receiving a strap or other flexible element comprising:
a fixed collar rotatably supporting a shaft connected to said reel;
a sun gear mounted on the end of said shaft;
a pair of planet gears engaged with said sun gear;
a ring gear surrounding and engaged with said planet gears;
a disk having a pair of axially extending stub shafts spaced outwardly from the center of the disk, with said planet gears mounted on said stub shafts;
a shaft connected to the center of said disk and extending axially away from the disk on the side opposite from said stub shafts and connected to one end of a reel rewinding spring;

a radially extending plate connected to one end of said ring gear, said plate having a centrally located hole which fits over said fixed collar to rotatably support the ring gear, said plate further having a pair of arcuate slots formed concentrically with said hole, each of said planet gear stub shafts extending respectively through one of said slots, an axially extending pin mounted on said plate on the side of the plate opposite from said planet gears, said pin being located near the end of one of said arcuate slots;

a capstan spring clutch having a plurality of coils surrounding and loosely gripping said collar, said clutch having a pair of outwardly extending end portions one of which includes a small loop portion that fits over said pin on the ring gear plate so that rotation of said plate produces a force on said loop and hence said clutch spring coils, said one end portion further includes an outwardly extending leg terminating in an axially extending tang, the other of said spring portions terminating in an axially extending tang spaced from but parallel to the other tang and opposing said other tang; and a rocker block element having a small hole for receiving the tang on said spring clutch end portion having said loop, said block element further having a second hole in which is positioned the other tang, the second hole being much larger than the tang positioned therein so that the tang can move transversely in the large hole, said rocker block element having an outer edge cam surface which is urged by said spring leg into engagement with a fixed surface surrounding said ring gear, a portion of said rocker block element being in the path of one of said planet gear stubs so that when such shaft nears the end of its travel within its plate slot it will pivotally snap said rocker block into a released position wherein the clutch spring ends are urged in a coil unwinding direction to permit movement of said ring gear in either strap extending or strap retracting directions, the spring and rocker block element being arranged so that a strap extending force on the sun gear will cause the rocker block element with its cam surface dragging against said surrounding fixed surface to pivotally snap the rocker block element to a position wherein the clutch spring end portions are positioned so that the ring gear can rotate in a strap extending direction but cannot rotate in a strap retracting direction.

16. Restraint apparatus comprising a support, a reel rotatably mounted on the support, a flexible element wound on the reel, one spring for urging the reel into an element retracted position, and drive means interconnecting said spring and the reel including means for automatically shifting the retracting force provided by said spring on the element from a high tension mode to a reduced but still positive tension mode wherein said automatic shifting means comprises:

a sun gear attached to said reel;

a disk having a shaft and an axial extending pin, said shaft driven by said spring to transmit the force of the spring to said axial extending pin;

a planetary gear rotatably supported on said pin and meshed with said sun gear for transmitting force between said shaft and said sun gear;

a means coupled to said planetary gear and to said pin for causing a direct drive relationship between said shaft and said sun gear during said high tension mode and for causing an indirect drive relationship between said shaft and said sun gear during said reduced tension mode.

17. Restraint apparatus comprising a support, a reel rotatably mounted on the support, a flexible element wound on the reel, one spring for urging the reel into an element retracted position, and drive means interconnecting said spring and the reel including means for automatically shifting the retracting force provided by said spring on the element from a high tension mode to a reduced but still positive tension mode wherein said automatic shifting means comprises:

a sun gear attached to said reel;

a disk having a shaft driven by said spring and having an axially extending pin;

a planetary gear rotatably supported by said pin and meshed with said sun gear;

a ring gear meshed with said planetary gear and having a slot of predetermined length in which said pin travels;

means coupled between said ring gear and said support for causing all of said sun, planetary and ring gears to move in unison in the same direction during extension of said flexible element in a direct drive high tension mode, but to allow said pins to move in said slots for the length of said slots during retraction in a reduced tension mode.

* * * * *